April 28, 1931. A. K. FISCHER 1,802,971
VALVE STRUCTURE
Filed April 13, 1928
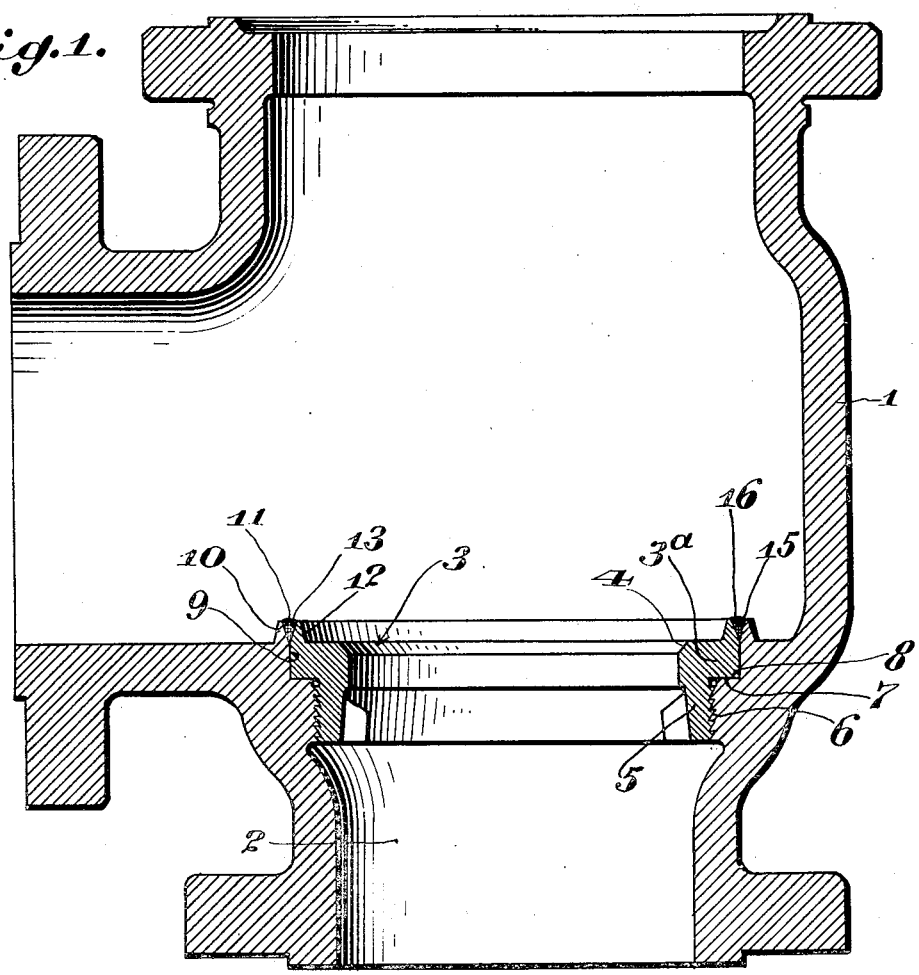

Patented Apr. 28, 1931

1,802,971

UNITED STATES PATENT OFFICE

ADALBERT K. FISCHER, OF PHILADELPHIA, PENNSYLVANIA, ASSIGNOR TO SCHUTTE AND KOERTING COMPANY, OF PHILADELPHIA, PENNSYLVANIA, A CORPORATION OF PENNSYLVANIA

VALVE STRUCTURE

Application filed April 13, 1928. Serial No. 269,644.

My invention relates broadly to valve structures but more particularly to improvements in the means and methods by which valve seat rings are secured in place within and upon valve casings.

In the methods and structures heretofore employed for securing valve seats in position within valve casings, closeness of contact between certain portions of the seats and the casings has been depended upon for forming hermetic joints; but in case these valves are employed for controlling the passage of steam or other heated fluids through pipes or tubes and the like, they expand and contract due to great changes in temperature which take place with the result that the valve seat rings loosen and permit leakage of the steam or other fluid. This is highly objectionable and it is a general object of my invention to provide means of novel construction whereby this difficulty and objection may be eliminated.

My invention is of especial advantage and utility when embodied in valve structures which are employed for controlling steam or other heated fluids but its utility and advantage are not restricted to valve structures which are so used because the said invention may be used to great advantage in handling fluids at ordinary atmospheric temperature.

It also is an object of my invention to provide a valve structure comprising means for renewably securing a valve seat ring within and to a valve casing in such manner that it is prevented from becoming loose after it has been placed in use.

Another object of my invention is to provide a valve structure in which novel means, supplemental to that usually employed in securing a valve seat ring in place within and to a valve casing, is embodied in the structure for preventing loosening of the said valve seat ring.

To these and other ends my invention comprehends the method and structure hereinafter described in detail, particularly pointed out in the claims and illustrated in the drawing in which certain forms of embodiment of the new structure are disclosed.

It is to be understood that the invention is susceptible of embodiment in structures of other forms than those shown and that changes in details of construction may be made within the scope of the claims without departing from the said invention or the principle thereof.

In the drawing:

Fig. 1 is a view in central section of a valve casing provided with a valve seat ring secured in place by the method and means embodying my invention;

Fig. 2 is a sectional view of a fragmentary portion of a modified construction of valve structure embodying the invention; and Fig. 3 is a view similar to that shown in Fig. 2 but showing still another modified construction of valve structure embodying the invention.

In the drawing I have shown, in Fig. 1, a valve casing 1 having a port 2 adapted to be controlled by a movable valve member, not shown, which cooperates with a valve seat ring 3. Except for the modification embodying my invention which hereinafter will be referred to and described in detail the valve seat ring is of usual construction comprising an annular portion 3ª having a bevel surface 4 against which the movable valve member is adapted to seat and an annular or circular screw threaded neck portion 5 which is in screw threaded engagement with the screw threaded portion 6 of the port 2. The external diameter of the screw threaded portion 5 is less than that of the portion 3ª previously referred to so that a shoulder is provided at 7 which is adapted to contact with a similar shoulder 8 upon the valve casing 1 at the bottom of a notch 9 formed in the valve casing at the inner end edge of the port 2. Heretofore the contact between the surfaces of the shoulders 7 and 8 has been relied upon mainly to prevent leakage of steam or other fluid past the valve.

When these valve structures are employed for controlling the passage of heated fluid such as steam they are subjected to relatively great temperature changes causing expansion and contraction. As a result of such expansion and contraction the valve seat ring loosens and permits leakage of fluid between the same and the valve casing. In other words leakage is permitted between the surfaces of the shoulders 7 and 8 and between the periphery of the annular portion 3ª and the surface on the outside of the notch 9.

In order to prevent such leakage I have provided an annular flange 10 which is integral with the casing 1 and surrounds the inner end of the notch 9. The inner side of the flange 10 is beveled outwardly as indicated at 11. I have also provided a corresponding annular flange 12 upon the outer edge portion of the inner side of the valve seat ring 3. The outer side of the said flange 12 is beveled as indicated at 13. These two flanges 10 and 12 are located in opposed relation to each other as shown in Fig. 1 and cooperate to form a V-shaped space as indicated at 15 which is adapted to be closed or filled with a filling of suitable metal 16 deposited by a welding or other suitable operation. The metal employed in this welding operation consists usually of soft steel, and in practice is deposited by means of an oxy-acetylene welding operation. By welding these flanges together in the manner and as described they become in effect integral with each other, in consequence of which the valve seat ring is prevented from becoming loose upon its seat whereby leakage of fluid between the seat ring and the valve casing is prevented.

It is necessary that these valve seat rings be renewed from time to time and renewal may be effected by "welding off" the previously deposited metal 16 after which the seat ring may be removed in known manner and a new ring substituted therefor. In other words, the metal ring 16 of relatively soft metal which is of V-shape in cross section may be removed by the application of a suitable oxy-acetylene or other flame thereto.

In Fig. 2 of the drawing I have shown a valve seat ring 20 which may be described generally as being of rectangular shape in cross section. The inner edge thereof is beveled as indicated at 4 to provide a seat for the movable valve member not shown. The valve casing 1 is provided with a notch having a flat bottom portion as indicated at 21 and a portion at 22 extending at right angles thereto and in parallel relation to the axis of the valve seat ring 20. The outer flat side of the valve seat ring is seated upon the shoulder 21 and is held in close contact therewith by means of bolts, one of which is shown at 23. The valve seat rings of this type of construction, as in the valve seat rings of the type of construction shown in Fig. 1, in practice are apt to become loose after they have been used for periods of greater or less length. In order to prevent loosening of valve seat rings of this type I have provided upon the inner lower edge thereof a flange 24 the outer edge of which is beveled as indicated at 25. I have also provided an opposing flange 26 which projects inwardly from the valve casing 1. The inner side of the flange 26 is beveled outwardly as indicated at 27. The two flanges 24 and 26 cooperate to form an annular V-shaped space which is filled with a filling of suitable metal 29, for instance, soft steel. This metal is united to the opposing surfaces of the flanges and in effect renders the two flanges integral with each other. Its deposition is effected in the same manner as described in connection with Fig. 1.

In Fig. 3 I have shown a construction identical with that illustrated in Fig. 2, except as hereinafter will appear, and like parts thereof are designated by the same reference numbers.

I have shown, however, in Fig. 3 an addition to the structure comprising an annular flange 30 which projects into the chamber of the valve casing from the outer edge of the inner side of the said valve seat ring. The outer side of the said flange is beveled as indicated at 31. An opposing similar annular flange 32 is provided upon the valve casing. The inner surface of the flange 32 is beveled outwardly as indicated at 33. The flanges 30 and 32 being in opposed relation to each other and the opposing sides thereof being beveled as shown co-operate to form a V-shaped annular groove which is adapted to be filled with a suitable metal 34 which may be deposited in any suitable manner as by the oxy-acetylene welding process. The metal employed in practice consists of soft steel and when deposited unites with the opposing surfaces of the annular groove between the flanges 30 and 32 and unites the said flanges forming a substantially integral structure.

As described in connection with the annular metal connecting ring 16, the metal rings 29 and 30 may be removed by the use of a suitable oxy-acetylene or other flame. Any suitable means may be employed for removing these deposited metal rings after which the valve seat rings may be removed either by unscrewing as in the case of the construction shown in Fig. 1 or by removing the holding or fastening bolts 23 which are shown in Figs. 2 and 3.

It will be seen that by my invention I have provided means whereby the valve seat rings of valve structures are prevented from becoming loose in practice. It will be noted that the said means is of such character that it may be removed and that after removal the valve seat rings may be removed and new rings substituted therefor, if removal and renewal should become necessary.

Having thus described my invention what I claim and desire to secure by Letters Patent is:

1. The method of securing a valve member provided with a seat in place in a valve casing, which comprises the depositing of metal between adjoining portions of said valve member and said valve casing on opposite sides of said valve seat.

2. The method of securing a valve seat ring in place in a valve casing which comprises the provision of flanges upon the said seat ring and the said valve casing which flanges, when the valve seat ring is in place, are located in opposed relation to each other and cooperative to form a groove and thereafter depositing by a welding operation a ring of relatively soft metal into said groove to unite said flanges.

3. The method of securing a valve seat ring within a valve casing in a manner to prevent loosening thereof which comprises the providing of annular flanges upon the said valve seat ring and upon the said valve casing in such position thereon that when the said valve seat ring is placed in position the said flanges are located in opposed relation to each other, tapering the said flanges away from each other to form a groove between the same, and depositing within the said groove a relatively soft metal, which is adapted to be melted out to permit removal of said valve seat ring for renewal.

4. The method of securing a valve seat ring in place in a valve casing which comprises the provision of a groove between an edge of the said valve seat ring and the adjoining portion of the valve casing and thereafter depositing by a welding operation relatively soft metal in said groove to unite the said valve seat ring and valve casing together, the said relatively soft metal being removable by the application of heat thereto to permit removal of the said valve seat ring.

5. A valve structure comprising a valve casing and a valve seat ring each of which is provided with an annular flange which projects inwardly of the valve casing which flanges are spaced from each other to form a groove and an annular ring of relatively soft metal welded in the said groove between the opposing sides of the said flanges.

6. A valve structure comprising a valve casing and a valve seat member, a member of relatively soft metal welded to said seat member and to said valve casing and supplemental fastening means interlocking with the said valve seat member and the said valve casing to prevent loosening of the said valve seat member.

7. A valve structure comprising a valve casing and a valve seat ring, means for detachably securing the said valve seat ring and said valve casing and supplemental fastening means comprising parallel annular flanges, one of which is located upon the said valve seat ring and the other of which is located upon the said valve casing, and means for securing the said flanges together.

8. A valve structure comprising a valve casing and a valve member provided with a valve seat, means for detachably securing said valve member to the said valve casing and means for uniting adjoining portions of said valve member and said valve casing on opposite sides of said valve member to prevent loosening of said valve member upon the said valve casing.

9. A valve structure comprising a valve casing and a valve seat ring, means for detachably securing the said valve seat ring to the said valve casing, the said valve seat ring and casing each being provided with an annular flange, which flanges are located in opposed spaced relation to each other and co-operate to form an annular groove, and an annular ring of metal located within said groove and having its opposite sides united to said flanges.

10. A valve structure comprising a valve casing and a valve seat ring, means for detachably securing the said valve seat ring to the said valve casing, the said valve casing and said valve seat ring each being provided with an annular flange, which flanges are located in opposed spaced relation to each other and co-operate to form an annular groove of V-shape in cross section, and an annular ring of metal, which is relatively soft as compared to the metal of the said valve casing and said valve seat ring, located within the said groove and united at its opposite sides with the said flanges.

11. A valve structure comprising a valve casing and a valve seat ring, said structure having an annular groove between an edge of said valve seat ring and the adjoining portion of said casing, and an annular ring of relatively soft metal welded in the said groove and operating to unite the opposing portions of the said valve ring and valve casing together.

In testimony that I claim the foregoing as my invention I have hereunto signed my name this 11th day of April A. D., 1928.

ADALBERT K. FISCHER.